United States Patent [19]
Grzywna et al.

[11] Patent Number: 5,323,692
[45] Date of Patent: Jun. 28, 1994

[54] POTATO BAKING DEVICE

[75] Inventors: Stanley E. Grzywna, Elyria; Mark Cartellone, Rocky River, both of Ohio

[73] Assignee: Mr. Coffee, Inc., Bedford Hts., Ohio

[21] Appl. No.: 938,811

[22] Filed: Sep. 1, 1992

[51] Int. Cl.⁵ .................................. A47J 37/04
[52] U.S. Cl. ........................... 99/343; 99/419; 99/421 A; 99/421 H; 7/110; 219/401; 219/438; 269/54.5; 294/61; 374/141
[58] Field of Search ............... 99/342, 343, 410, 413, 99/419, 421 H, 421 HH, 421 TP, 447, 421 A; 7/110, 170; 30/303, 366; 294/61; 374/141, 150, 205–207; 219/401, 436, 438, 441, 442; 269/54.5

[56] References Cited

U.S. PATENT DOCUMENTS

| | | | |
|---|---|---|---|
| 386,604 | 7/1888 | Place | 269/54.5 |
| 931,587 | 8/1909 | Fairbanks . | |
| 1,790,194 | 1/1931 | Amacher . | |
| 1,915,962 | 6/1933 | Vaughn . | |
| 1,990,412 | 2/1935 | Merritt | 99/419 |
| 2,096,726 | 10/1937 | Barton | 99/419 |
| 2,276,178 | 3/1942 | Ford | 374/207 |
| 2,558,294 | 6/1951 | Finizie | 219/401 |
| 2,881,816 | 4/1959 | Batt | 294/61 |
| 2,898,845 | 8/1959 | Dight | 99/421 TP |
| 2,953,180 | 9/1960 | Kyles | 269/54.5 |
| 3,075,454 | 1/1963 | Henyan | 99/421 TP |
| 3,173,358 | 3/1965 | Linquist | 99/421 H |
| 3,180,383 | 4/1965 | Nudell | 294/61 |
| 3,377,943 | 4/1968 | Martin | 99/419 |
| 3,577,908 | 5/1971 | Burg | 219/442 |
| 3,635,146 | 1/1972 | Aubert | 99/339 |
| 3,965,808 | 6/1976 | Chomette | 99/419 |
| 3,982,478 | 9/1976 | Szewczyk | 99/419 |
| 4,272,669 | 6/1981 | Yamanaka et al. | 219/385 |
| 4,372,199 | 2/1983 | Brown et al. | 99/341 |
| 4,558,197 | 12/1985 | Wyatt | 219/10.55 E |

FOREIGN PATENT DOCUMENTS

| | | | |
|---|---|---|---|
| 1046586 | 12/1953 | France | 99/421 H |
| 2603178 | 3/1988 | France | 99/419 |
| 581962 | 9/1958 | Italy | 99/421 H |
| 459498 | 9/1968 | Switzerland | 99/419 |
| 462612 | 3/1937 | United Kingdom | 99/421 H |
| 2119636 | 11/1983 | United Kingdom | 99/419 |
| 2147418 | 5/1985 | United Kingdom | 374/141 |

*Primary Examiner*—Timothy F. Simone
*Assistant Examiner*—Mark Spisich
*Attorney, Agent, or Firm*—D. Peter Hochberg; Mark Kusner; Michael Jaffe

[57] ABSTRACT

A potato baking device comprising a self-supporting base and lid, wherein the base and lid define a cooking chamber for baking potatoes. A heating plate is provided inside the cooking chamber for conducting heat throughout the cooking chamber. A plurality of detachable heat conductive skewers are provided on which potatoes are mounted and placed into the cooking chamber such that the skewers are in contact with the heating plate. To facilitate mounting the potatoes onto the skewers, a mounting block is provided. A temperature sensing unit is also provided to determine the internal temperature of the potato and indicate when cooking is completed.

22 Claims, 6 Drawing Sheets

POTATO BAKING DEVICE

FIELD OF INVENTION

The present invention related generally to a cooking appliance and more particularly to a device for baking potatoes by conduction and convection heating.

BACKGROUND OF THE INVENTION

Baked potatoes have long been prepared and served as part of a traditional balanced meal. More recently, however, baked potatoes with toppings, such as cheese and broccoli, have become popular as a snack and as a meal in and of themselves. Typically, baked potatoes have been prepared in conventional convection ovens. A problem with using such ovens has been the relatively long baking times (approximately 45-55 minutes) required to prepare baked potatoes, as well as the inconvenience and inefficiency of operating a full-sized oven to bake one or two potatoes. Microwave ovens have provided a solution to the long baking times associated inherently with conventional convection ovens. In this respect, a microwave oven can prepare an average sized potato in approximately 5-15 minutes. A microwave oven, however, does not actually "bake" the potato and consequently the resulting potato lacks the flavor and texture of a potato baked by a conventional convection oven.

The present invention overcomes these and other drawbacks of prior art devices and provides a cooking appliance for quickly and easily preparing baked potatoes, which appliance is compact, convenient, and easy to use.

SUMMARY OF THE INVENTION

According to the present invention there is provided a potato cooking device including a self-supporting base and a lid attached to the base. A cooking chamber is defined between the base and the lid, and is dimensioned to receive at least one average size potato therein. A heat conductive plate having a heat source attached thereto is disposed within the baking chamber. A removable elongated skewer, formed of a heat conductive material and dimensioned to span the length of the conductive plate is provided to penetrate lengthwise through a potato and to support the potato within the cooking chamber with the elongated skewer in thermally conductive contact with the conductive plate.

According to another aspect of the present invention there is provided a potato cooking device comprising a self-supporting base and a lid attached to the base. A cooking chamber is defined between the base and the lid, and is dimensioned to receive at least one average size potato therein. A heat source and a heat conductive plate are disposed within the cooking chamber. The device also includes an elongated, detachable skewer formed of heat conductive material having vanes which are symmetrical about a central axis and having sufficient length to extend through an average potato and to have portions of the skewer extending from both ends of the potato. Means for positioning locates the skewer within the cooking chamber wherein the portions of the skewer extending from the potato rest in contact on the conductive plate.

According to another aspect of the present invention there is provided a temperature sensing device for use with a potato baking device as described above for indicating the internal temperature of a potato being cooked therein. The temperature sensing unit is generally comprised of a tubular body portion formed of an insulating material having a temperature indicator gauge at one end and a temperature sensing tip at the other end.

According to another aspect of the present invention there is a mounting block for use in conjunction with a potato cooking device as described above to facilitate insertion of a skewer through a potato. The mounting block is generally symmetrical about a central axis and has first and second opposite facing cavities which are generally symmetrical about the central axis. The first cavity includes a protrusion for puncturing the potato to provide a starting position for insertion of the skewer, and the second cavity includes pins on which a potato may be placed to hold the potato in a lengthwise vertical position while the skewer is inserted into the potato.

According to another aspect of the present invention there is provided a method of cooking a potato comprising the steps of: (a) providing a cooking device having a cooking chamber, a heat conductive plate, a heat source thermally connected to the plate, and a removable skewer positionable in the cooking chamber, (b) placing a potato onto the skewer, (c) placing a predetermined amount of water together with the skewer mounted potato into the cooking chamber wherein portions of the skewer are in thermally conductive contact with the plate, and (d) causing said heat source to heat the plate to a temperature exceeding the boiling point of water to generate steam within said cooking chamber.

It is an object of the present invention to provide a counter top device for baking potatoes.

It is another object of the present invention to provide a potato cooking device as defined above for baking potatoes efficiently and in less time than a conventional convection oven.

It is another object of the present invention to provide a potato cooking device which cooks a potato by convection and conduction heating.

It is another object of the present invention to provide a potato cooking device as described above which produces baked potatoes with the texture and flavor of oven baked potatoes.

It is another object of the present invention to provide a potato cooking device as described above which includes at least one detachable skewer, which skewer is adapted to extend through a potato and to support a potato within the device.

It is another object of the present invention to provide a potato cooking device as described above having a skewer formed of a heat conductive material conducting heat into the interior of a potato.

It is another object of the present invention to provide a potato cooking device as described above including a skewer which conducts heat evenly along the length of the skewer and does not scorch or burn a potato mounted on the skewer.

A still further object of the present invention is to provide a potato cooking device as described above which includes a temperature sensing unit and which is sensitive only to the internal temperature of the potato.

A still further object of the present invention is to provide a potato cooking device as described above which includes a mounting block that facilitates mounting potatoes upon a skewer.

A still further object of the present invention is to provide a method of cooking a potato utilizing steam to reduce the cooking time of a potato.

A still further object of the present invention to provide a potato baking device as described above which is compact and convenient to use.

These and other objects will become apparent from the following description of a preferred embodiment taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof and wherein.

DETAILED DESCRIPTION

Figure 1:
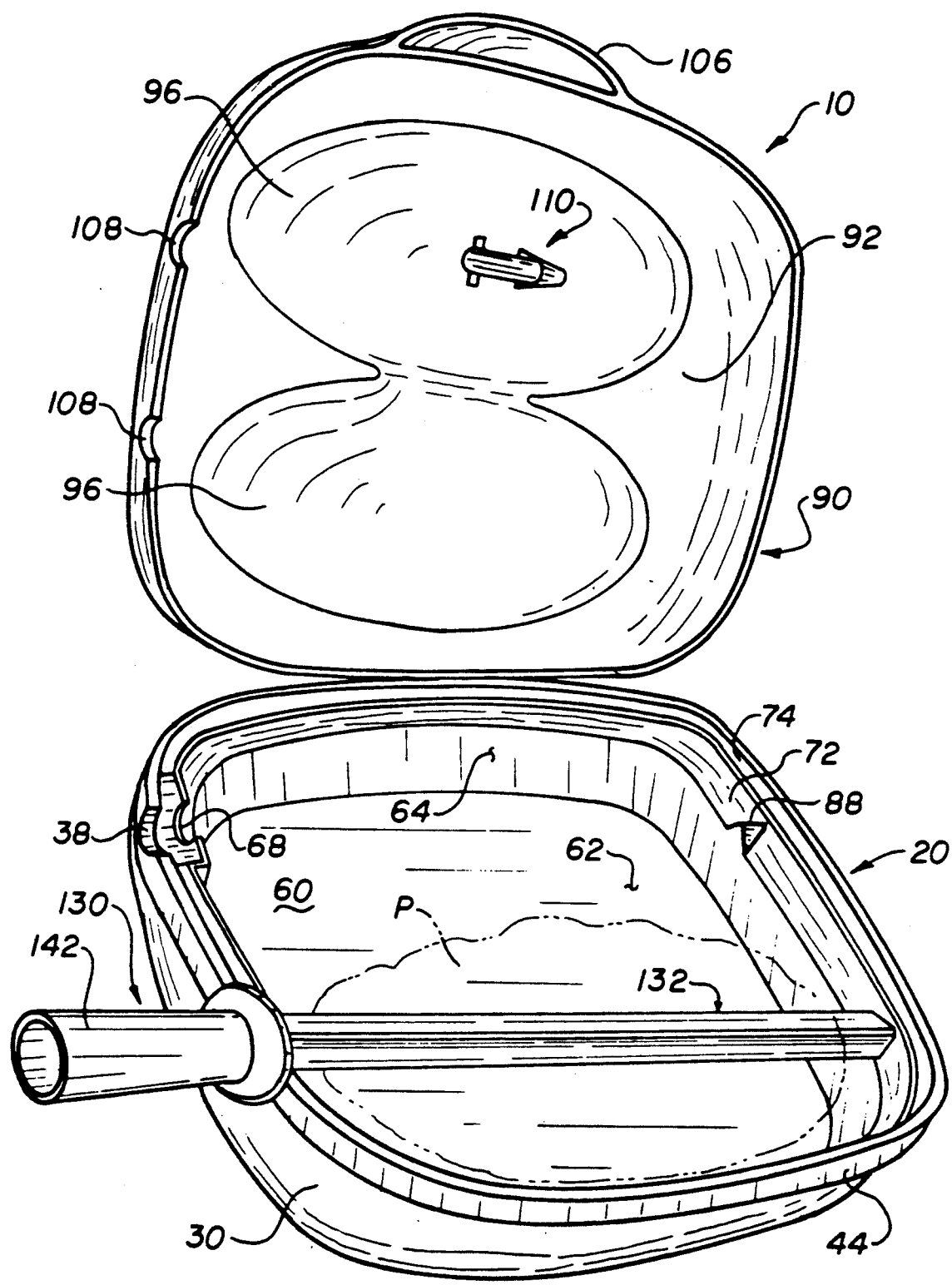
FIG. 1 is a perspective view of a potato cooking device illustrating a preferred embodiment of the present invention.

Referring now to the drawing wherein the showing is for the purpose of illustrating a preferred embodiment of the invention only, and not for the purpose of limiting same, FIG. 1 shows a potato cooking device 10 according to the present invention. In the embodiment shown, the device 10 is adapted to bake two average sized potatoes, although it is well appreciated from a further reading of this specification that the present invention may be configured in a variety of different ways to cook one, two or more potatoes without deviating from the present invention. In the embodiment shown, device 10, as best seen in FIG. 1, is generally comprised of a base portion 20, a lid 90, and a pair of skewers 130, (only one of which is shown in FIG. 1).

Figure 4:
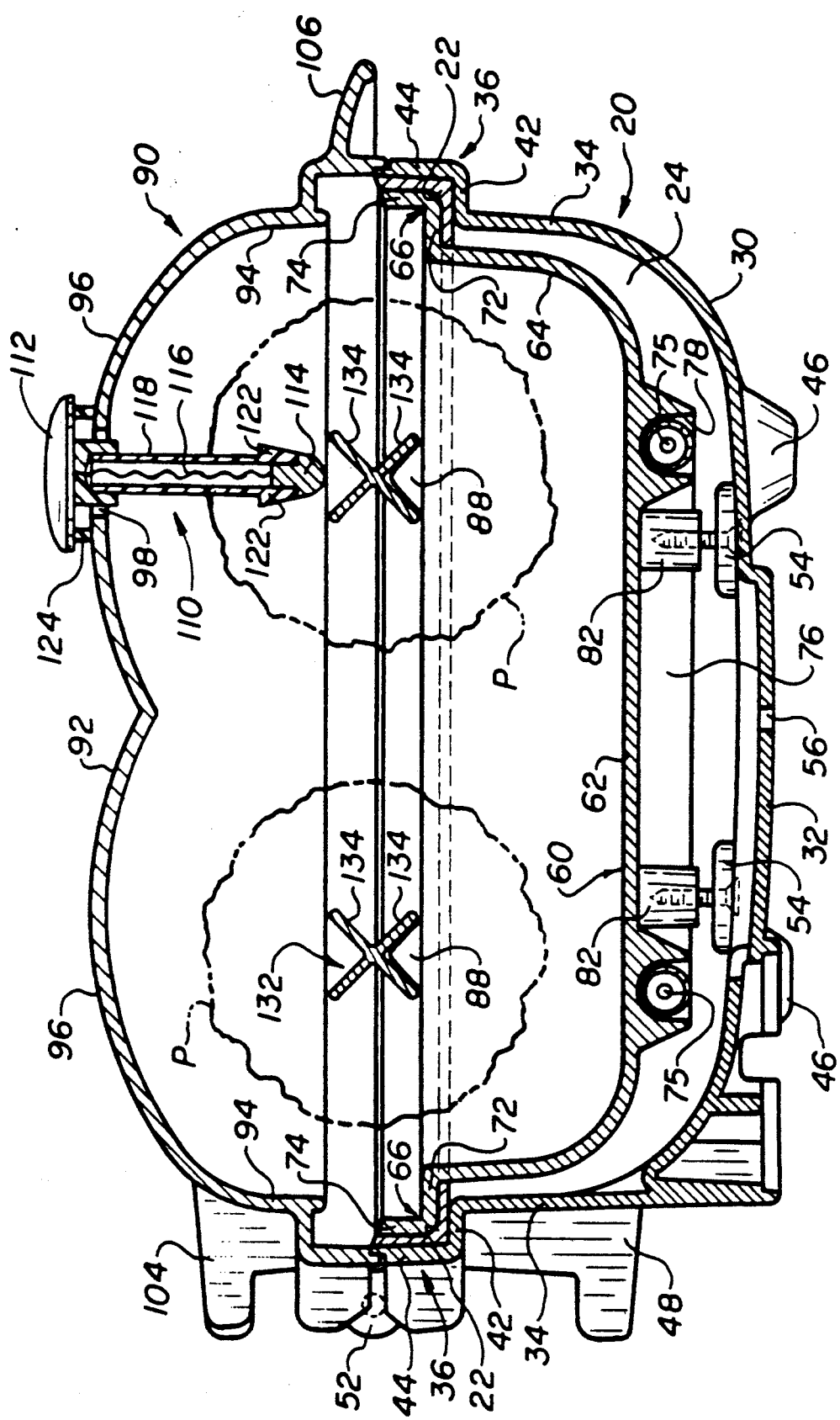
FIG. 4 is a sectional view taken along 4—4 of FIG. 3.

Base portion 20, best seen in FIG. 4, includes an outer housing 30 and an inner plate 60 formed of a heat conductive material, which plate 60 is dimensioned to conform generally to, and be positioned within outer housing 30. Outer housing 30 is generally concave in shape and includes a bottom portion 32 and an upward extending wall portion 34, integrally formed therewith. An L-shaped shoulder 36 is provided along the upper peripheral edge of wall portion 34. Shoulder 36 is comprised of a horizontal section 42 which extends outward from the peripheral edge of wall portion 34 and a vertical section 44. A pair of semicircular notches 38 are formed in vertical section 44 of shoulder 36, as best seen in FIG. 1.

Figure 2:
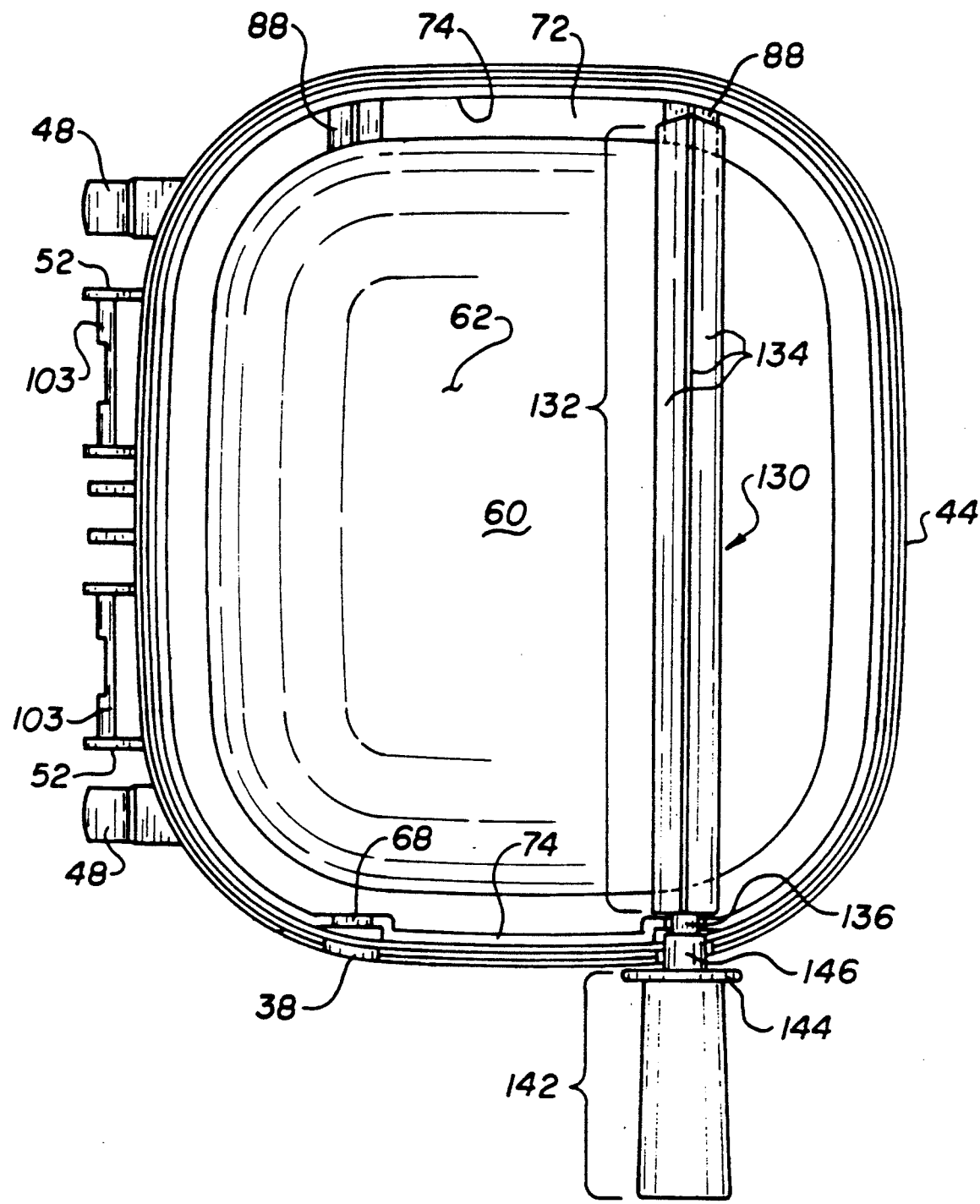
FIG. 2 is a top plan view of the lower portion of the potato cooking device shown in FIG. 1.

A plurality of conical legs 46 are integrally molded and extend downward from the outer surface of bottom portion 32. A plurality of generally symmetrical mounting locations 54 are formed and extend upward from the inner surface of housing 30. Each mounting location 54 includes a generally centrally located hole extending therethrough. A vent hole 56 is also formed in bottom portion 32 of housing 30. As best seen in FIG. 2, a pair of hinge sections 52 extend outward from the outer surface of wall portion 34 of base portion 20. Adjacent each hinge section 52, a pair of auxiliary legs 48 are provided.

As best seen in FIG. 4, base portion 20 also includes an inner conducting plate 60 dimensioned to be received by outer housing 30. Plate 60 is generally concave and formed in the shape of a pan having a generally planar, rectangular bottom portion 62 and an upward extending wall portion 64, integrally formed therewith. Along the upper edge of wall portion 64 an L-shaped shoulder 66 is formed. Shoulder 66 is comprised of a horizontal section 72 and a vertical section 74. Horizontal section 72 extends outward from the peripheral edge of wall portion 64 and includes a pair of upward projecting mounting pads 88 as best seen in FIG. 2. A pair of semicircular notches 68 are formed in vertical section 74. Semicircular notches 68 in plate 60 are positioned to be in registry with notches 38 in outer housing 30 when plate 60 is positioned therein. A generally C-shaped rib 76 is formed to extend downward from base portion 62 of plate 60. Rib 76 includes a downward facing, generally U-shaped cavity 78 which is formed to house an electrical heating element 75. The electrical heating element is of a type conventionally known and typically found in many household appliances. A thermostat (not shown) is provided in conjunction with the electrical heating element to limit the temperature of the heating element. In this respect, the thermostat is operable to cut-off current to the heating element when the temperature thereof exceeds a predetermined temperature and to resume current to the heating element after the temperature thereof has dropped back down to normal operating range. In the embodiment shown, the thermostat is preferably set to limit the temperature of the heating element to a range of between 500°–700° Fahrenheit, and more specifically to approximately 600° Fahrenheit. The heating element is preferably press fit or braised within cavity 78 in rib 76. Electrical power is provided to the heating element by a conventional electrical cord having a plug which is connectable to a conventional 120 volt electrical outlet.

A plurality of spaced-apart mounting bosses 82 are formed to extend downward from bottom portion 62 of plate 60. According to the present invention, plate 60 is formed of a heat conductive material preferably metal and in the embodiment shown is formed of a cast aluminum.

Plate 60 is dimensioned to be positioned within outer housing 30 and to create air gap 24 between outer housing 30 and pan 60. Conventional-known fasteners extending through the holes of mounting locations 54 of outer housing 30, are threaded into mounting bosses 82 of plate 60 to secure plate 60 to outer housing 30. A gasket 22 is positioned between L-shaped shoulder 36 of outer housing 30 and L-shaped shoulder 66 of pan 60. Gasket 22 is provided to thermally isolate pan 60 from outer housing 30 and to this end, is preferably formed of a high temperature resistant material, such as Vanguard Silicone Compound VC2300.

Figure 3:
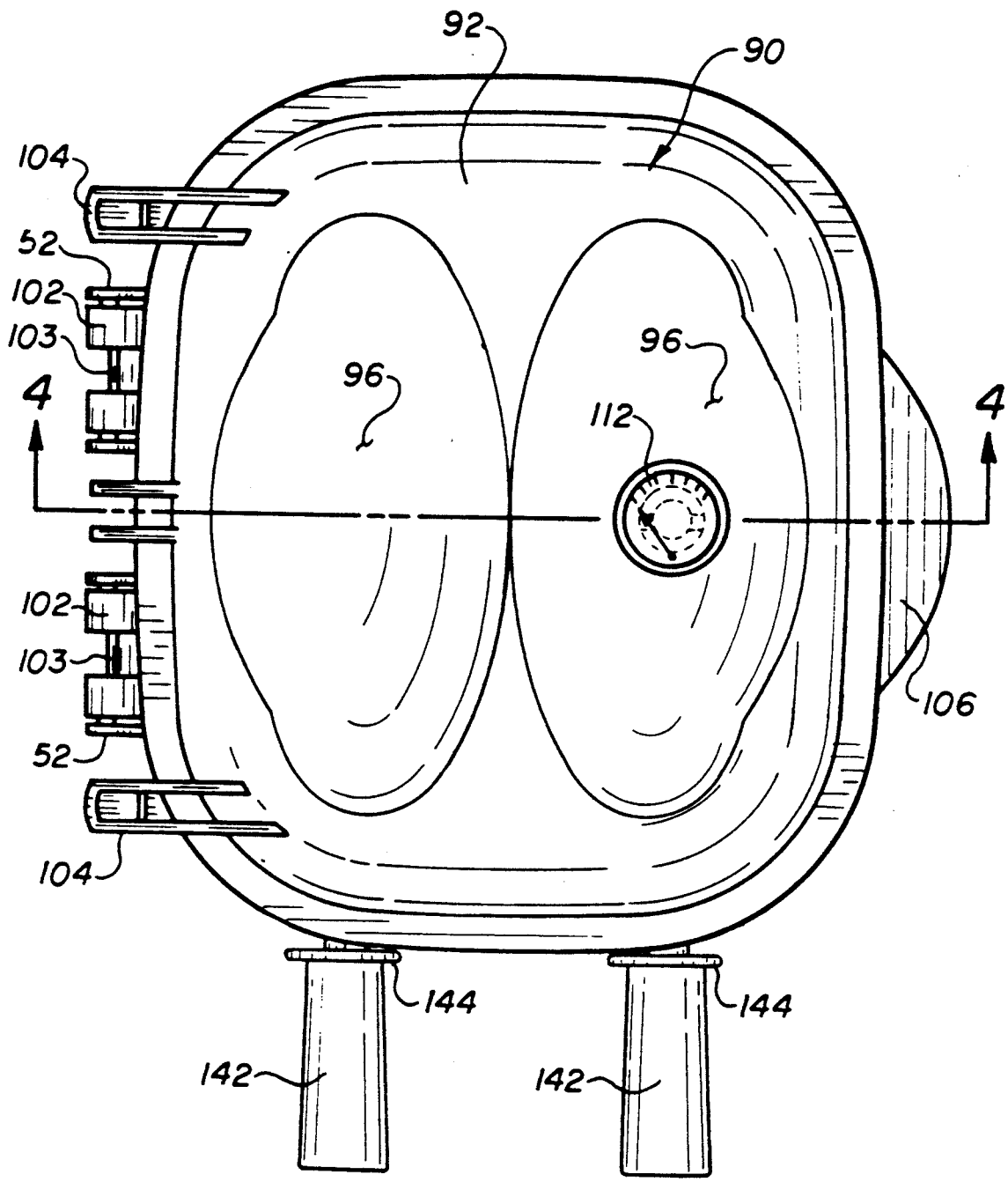
FIG. 3 is a top plan view of the potato cooking device shown in FIG. 1.

Lid 90 is shaped to conform generally to the shape of outer housing 30, as best seen in FIG. 1. In this respect, lid 90 has a generally concave shape with a generally rectangular ceiling portion 92 and a downward extending wall portion 94 integrally formed therewith. A pair of dome portions 96 are formed within ceiling portion 92. An aperture 98 is formed in the center of one of the dome portions 96 to receive a temperature sensing unit 110, best seen in FIG. 5, which will be described in greater detail below. As best seen in FIG. 3, a pair of auxiliary legs 104 which are dimensioned to be aligned with auxiliary legs 48 of outer housing 30 extend from wall portion 94. Between auxiliary legs 104, a pair hinge sections 102, which are positioned to operatively mate with hinge sections 52 of outer housing 30 are provided. A pin 103 extends through hinge sections 52 and 102 when lid 90 is pivotable about a generally horizontal axis. A handle 106 extends from wall portion 94 opposite hinge sections 102.

According to the present invention, outer housing 30 and lid 90 are preferably formed of high temperature resistant plastic that can withstand the operative temperatures of device 10. In the embodiment shown, outer housing 30 and lid 90 are formed of Eastman Ektar AG215.

Figure 5:
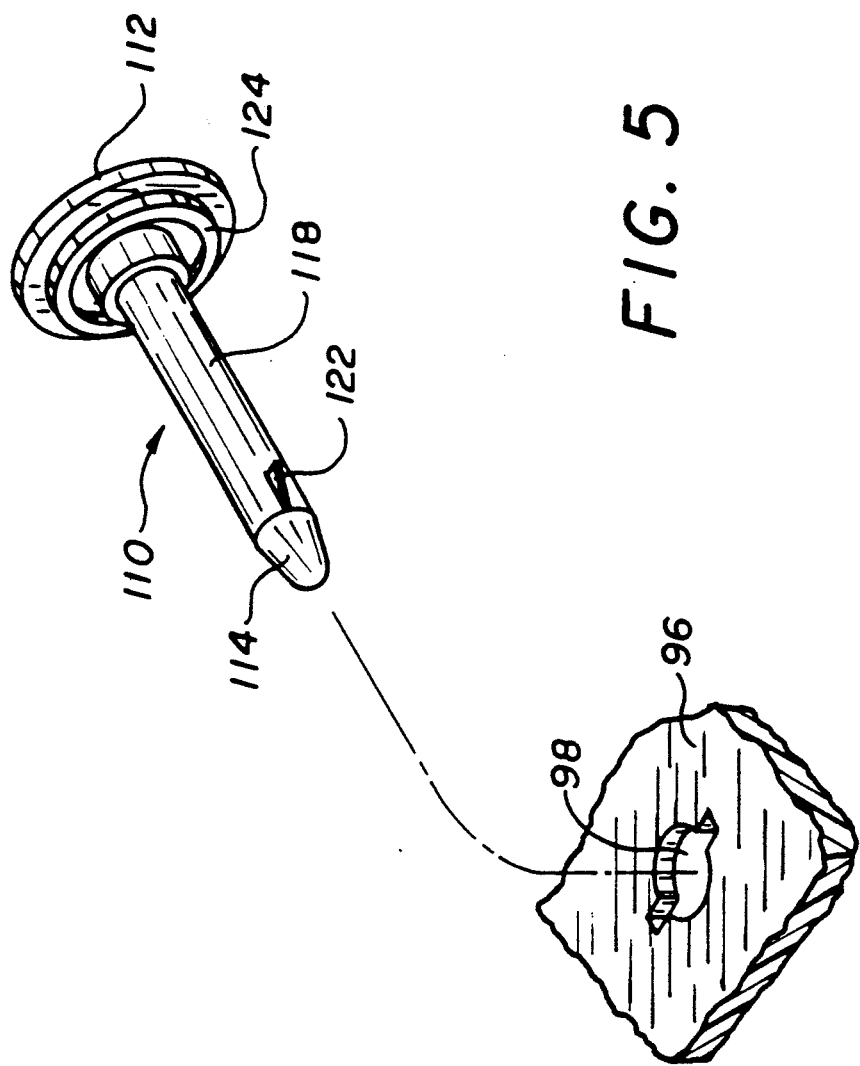
FIG. 5 is an exploded, perspective view of a temperature sensing unit illustrating another aspect of the present invention.

Referring now to FIG. 5, temperature sensing unit 110 is best shown. Temperature sensing unit 110 is generally cylindrical in shape, and includes a tubular body portion 118, having a temperature gauge 112 at one end, as best seen in FIG. 4, and a generally conical temperature sensing tip 114 at the other end. A bi-metallic element 116 is disposed within body portion 118 between sensing tip 114 and gauge 112. Tubular body portion also includes an enlarged body portion 124 adjacent gauge 112, which forms an annular surface. According to the present invention, tubular body portion 118 is preferably formed of an insulating material such as plastic, ceramic or the like. In the embodiment shown, tubular body portion 118 is formed of Eastman Ektar AG215. In this respect, tubular body portion 118 acts as an insulator and shields bi-metallic element 116 from heat outside sensing tip 114. Preferably, temperature gauge 112 and sensing tip 114 are press fit into tubular body portion 118 to form a tight seal. Tubular body portion 118 also includes a pair of generally triangular shaped wings 122 which extend radially outward from the outer surface of the tubular body portion 118. Wings 122 preferably include relatively sharp leading edges, which generally face the direction of sensing tip 114.

In the embodiment shown, two generally identical skewers 130 best seen in FIG. 3 are provided to support potatoes within cooking chamber 12 of device 10. Because skewers 130 are identically, only one skewer 130 will be described in detail, it being understood that such description applies equally to the other skewer 130. As best seen in FIG. 2, skewer 130 is generally comprised of an elongated blade portion 132 and a handle portion 142. According to the present invention, blade portion 132 is constructed of a material having good heat conductive characteristics. In the preferred embodiment shown, blade portion 132 is formed of an aluminum alloy and includes four equally spaced vanes 134, which are generally disposed at 90 degrees to each other and form a generally decussate cross-section, as seen in FIG. 4. Each vane 134 is slightly thicker near the axis of skewer 130 than at the outer edge of the vane such that the angle between the surfaces of adjacent vanes 134 is slightly greater than 90°, and in the embodiment shown is approximately 91°. It should be appreciated that while the embodiment shown has a four vane design, any number of vanes disposed at equal angles relative to each other may be suitable. In fact, even a single flat knife edge design would be suitable in an alternative embodiment. Importantly, according to the present invention blade portion 132 is dimensioned such that two vanes 134 rest upon and mate with mounting pad 88 wherein the surfaces of vanes 134 engage the surfaces of mounting pad 88. Blade portion 132 also includes a reduced portion 136 at the handle end of skewer 130 and has a tapered tip at the opposite end. Handle portion 142 is generally cylindrical in shape and includes an outward extending circular flange 144 and a reduced portion 146. Handle 142 is preferably molded onto reduced portion 136 such that a section of reduced portion 136 of blade portion 132 is exposed.

Figure 7:
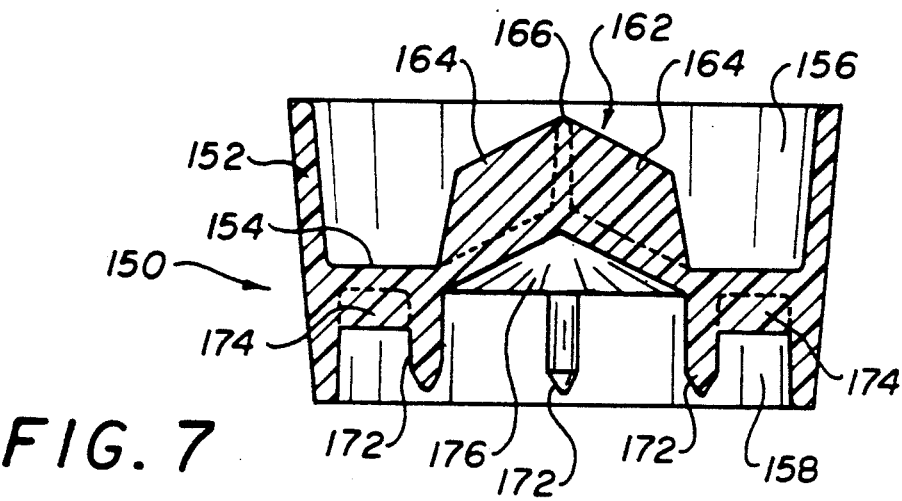
FIG. 7 is a sectional elevational view taken along lines 7—7 of FIG. 6.
Figure 8:
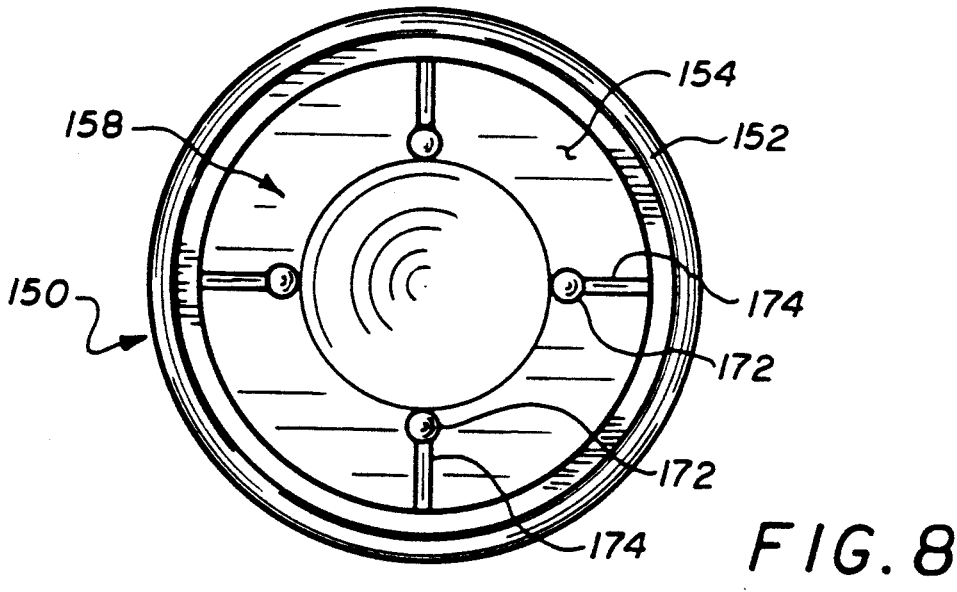
FIG. 8 is a bottom plan view of the mounting block shown in FIGS. 6 and 7.

Referring now to FIG. 7, a mounting block 150 is provided to facilitate insertion of a skewer 130 into a potato as shown. Mounting block 150 is generally comprised of a cylindrical wall 152. An inner partition 154 which spans the opening defined by wall 152 into an upper cavity 156 and a lower cavity 158. A projection 162 extends from one side of partition 154. Projection 162 is generally comprised of four spaced-apart plates 164 which are generally symmetrical with the axis defining cylindrical wall 152 and converge to a point 166 which is disposed along the axis of mounting block 150. A cutting edge 168 is provided on each plate 164. In this respect, projection 162 is dimensioned to generally correspond in cross-section to the configuration of skewer 130.

A plurality of pins 172 extend from partition 154 in a direction opposite to that of projection 162. Pins 172 are equi-spaced from each other and are generally symmetrically disposed about the axis of mounting block 150. A reinforced wall 174 projected partition 154 extends between each pin 174 extends between each pin 172 and cylindrical wall 152. The free ends of pin are pointed and disposed below the end surface of cylindrical wall 152. As best seen in FIG. 7, a conical recess 176 is formed between pins 172. According to the present invention, in addition to its use in mounting potatoes to skewer 130, mounting block 140 is adapted likewise to serve as a fluid measuring device. In this respect, upper cavity 156 is dimensioned to hold a predetermined amount of water. In the embodiment shown, upper cavity 156 is dimensioned to hold approximately one and one-half (1½) ounces of water.

Blade portion 132 is dimensioned to have a length which is sufficient to extend lengthwise through an average sized potato and which will span plate 60, as will be described in greater detail below. Mounting block 150 is preferably formed of a durable plastic material, such as polyethylene, polystyrene, polyolefin polypropylene, ABS resins, nylons or the like.

Operation

Figure 6:
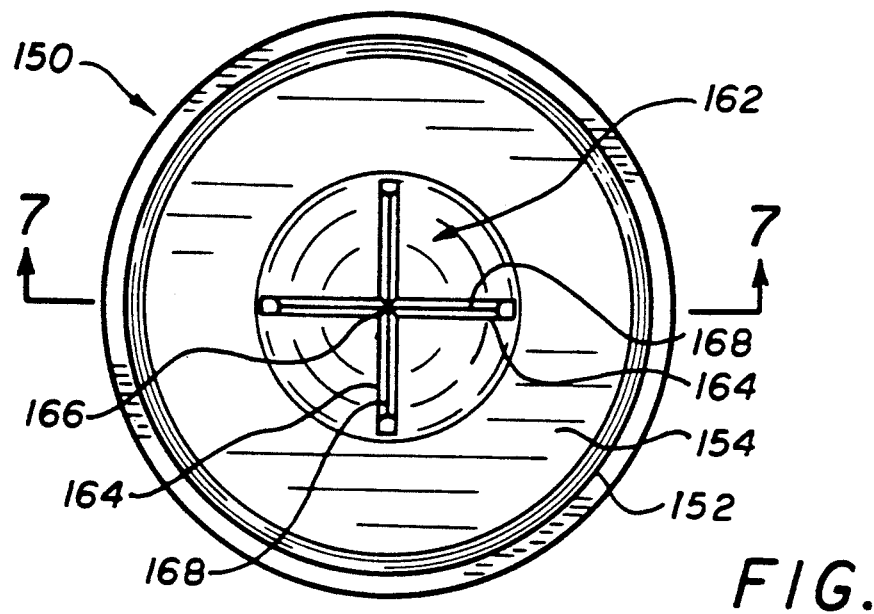
FIG. 6 is a top plan view of a mounting block illustrating another aspect of the present invention.

Referring now to the operation of the present invention, base portion 20 and lid 90 form a cooking chamber 12 dimensioned to receive two average-sized potatoes. According to the present invention, a potato, shown in phantom and designated "P" in the drawings, is placed into cooking chamber 12 mounted onto blade portion 132 of skewer 130. In this respect, mounting block 150 is used to facilitate placement of the potato onto blade portion 132 of skewer 130. Mounting block 150 is placed on a planar surface, such as a table top, counter top or the like, with projection 162 facing upward, as seen in FIG. 6. One lengthwise end of a potato is pressed firmly downward onto projection 162 such that point 166 and cutting edges 168 of blades 166 punctures the skin of the potato and forms an incision which generally corresponds with the cross-sectional shape of blade portion 132 of skewer 130. The potato is then removed from projection 162 and mounting block 150 is inverted such that pins 172 face upward. The opposite lengthwise end of the potato is then pressed firmly downward onto pins 158 of mounting block such that the end of the potato having the incision therein is facing upward with pins 158 securely embedded in the potato wherein mounting block 150 supports and holds the potato in a generally vertical position. With the potato in this position, blade portion 132 of skewer 130 may be pushed downward through the length of the potato, beginning at the incision formed by projection 162. The pointed tip end of blade portion 132 is received in conical recess 176 of mounting block 150 as the pointed tip penetrates through the held end of the potato. With the tip end of blade portion 132 barely projecting through the potato, the potato (with skewer 130 therein) is removed from pins 172 of mounting block 150. With the potato gripped firmly in one hand and handle portion 142 in the other hand, the potato may be slid along blade portion 132 to a generally central position, wherein sections of blade portion 132 will be exposed at each end of the potato at which point the potato is ready for insertion into cooking device 10. Thus, mounting block 150 facilitates mounting of the potato onto skewer 130 and more importantly, prevents the likelihood of injury during such procedure and further reduces the likelihood of damage to the counter top or table top surfaces during the mounting procedure.

With a potato mounted onto the blade portion 132 of skewer 130 and positioned thereon such that equal sections of blade portion 132 are exposed at each end of the potato, the potato is then placed into cooking chamber 12. In this respect, manipulation and positioning of the potato is easily accomplished utilizing handle portion 142 of skewer 130. Importantly, according to the present invention, vanes 134 at the tip end and at the handle end of blade portion 132 are positioned to rest on plate 60. Specifically, the free end of blade portion 132 is dimensioned to rest on mounting pads 88 of horizontal section 72 of L-shaped shoulder 66. In this position, the potato is suspended above bottom portion 62 of plate 60. Skewer 130 is positioned within cooking chamber 12, by means of reduced portion 136 of blade 132 and reduced portion 146 of handle 142 interacting with notch 68 of plate 60 and notch 38 of housing 30. More specifically, as best seen in FIG. 2, notch 38 of outer housing 30 is designed to receive reduced portion 146 of handle portion 142, while notch 68 is designed to receive the exposed section of reduced portion 136 of blade portion 132. In this respect, the diameter of flange 144 of handle 142 relative to the diameter of notch 38 of outer housing 30, prevents axial movement of skewer 130 in one direction, while the diameter of blade portion 132 relative to the diameter of notch 68 of pan 60, prevents axial movement of skewer 130 in the other direction. Accordingly, skewer 130 is fixedly positioned along its axis.

As indicated above, the free end of blade portion 132 is dimensioned to rest on mounting pad 88 of plate 60. Importantly, according to the present invention, the surfaces of vanes 134 are configured to conform to the surfaces of mounting pad 88 and to set in surface contact thereon. In this respect, because all of vanes 134 are disposed at equal angles to each other, any two vanes 134 of blade portion 142 will mate with mounting pad 88. This permits skewer 130 to be rotatable about its longitudinal axis to several positions. At the handle end of blade portion 132 the radial ends of vanes 134 rest on horizontal section 72 of L-shaped shoulder 66. According to one aspect of the present invention, a predetermined amount of water is added to the cavity defined by plate 60 to facilitate cooking of the potato(es). Specifically, with the embodiment shown, preferably two to four ounces of water is added. As indicated above, cavity 156 is preferably formed to hold one and one-half (1½) ounces of water wherein cavity 156 may be filled twice to provide the desired amount of water for use in device 10. The effect of the water shall be described in greater detail below.

With a potato mounted on skewer 130, and skewer 130 resting on plate 60, lid 90 is pivoted closed. Temperature sensing unit 110 is inserted through aperture 98 of lid 90 into the potato, until the annular surface of enlarged body portion 124 engages the outer surface of lid 90. In this respect, sensing unit 110 is dimensioned such that sensing tip 114 is positioned near the internal center of the potato when enlarged body portion 124 is in contact with lid 90, as best seen in FIG. 4. The sharp edges of wings 122 on body portion 124 form lateral slits in the skin of the potato as sensing unit 110 is forced into the potato. These slits allow internal pressure created within the potato during cooking to be vented, and prevents sensing unit 110 from being forced out of the potato by such pressure.

Device 10 is turned on by inserting the plug on the electrical cord connected to the heating element into a conventional 120 volt electrical outlet, wherein the heating element begins to heat plate 60. As plate 60 heats and reaches 100° C. or 212° F., the water within plate 60 will turn to steam and moisten the potato. It is believed that the steaming process provides moist heat that penetrates the potato faster than dry heat, and as a result reduces the baking time of the potato. In this respect, it has been found that utilizing a device 10 as previously described, a potato bakes in approximately 30–35 minutes without the added water, while a potato bakes in roughly 20–25 minutes with the water. Thus, it is believed that the moisture in cooking chamber 12 helps conduct the heat more efficiently to the potato. Additionally, the moisture in cooking chamber 12 provides uniform heating while plate 60 is heating up, and prevents the potato from becoming dried out during baking.

After a period of time, all the water within plate 60 will have been steamed away. The temperature of plate 60 will rise beyond 100° C. or 212° F., and temperature in cooking chamber 12 will increase. As the temperature within cooking chamber increases, the potato is cooked by convection as well as conduction heating. Specifically, the exterior of the potato is cooked by convection heating, while the interior of the potato is cooked by conduction heating through skewers 130. In this respect, as indicated above, blade portion 132 of skewer 130 is formed of a heat conductive material, such as aluminum alloy, and both ends of blade portion 132 are in contact with heated plate 60. At the handle end of skewer 130, blade portion 132 is in contact with plate 60, while at the other end of skewer 130, the free end of blade portion 132 is in contact with mounting pad 88 of plate 60. As a result, heat is conducted through both ends of blade portion 132 into the potato. Additionally, the generally decussate cross-section design of blade portion 132 increases the surface area exposed to the potato, and this increases the heat transferred thereto. The potato is heated externally by convection as the heat from plate 60 surrounds the potato in cooking chamber 12, and simultaneously cooks by conduction heating.

Sensing unit 110 provides an indication of the temperature inside the potato, as detected by sensing tip 114. Because tubular body portion 118 isolates bi-metallic element 116 from external heat, more accurate temperature readings are provided. In this respect, bi-metallic element 116 is responsive only to the internal heat of the potato, as sensed by sensing tip 114, rather than the external heat surrounding the potato inside cooking chamber 12. The internal temperature of the potato will be indicated by temperature gauge 112 of sensing unit 110, which gauge 112 includes a "red zone" which indicates that the interior of the potato has reached a predetermined temperature and that it has been completely cooked. When temperature gauge 112 reaches the "red zone", device 10 can be unplugged, lid 90 can be lifted open, and the potato removed from cooking chamber 12 by grasping handle portion 142 of skewer 130. Since handle portion 142 of skewer 130 remains outside cooking chamber 12, handle portion 142 remains cool during cooking. This allows skewers 130 to be held after cooking, without the risk of burning the user.

In the event that a malfunction should occur during heating, device 10 includes two safety features. When the thermostat detects a temperature exceeding a first predetermined temperature, it will automatically shut down device 10 until the thermostat cools down to a second predetermined temperature below the first predetermined temperature. In other words, the thermostat enables continued operation of device 10 but establishes an upper operating temperature for device 10. In the event that the thermostat fails, the present invention includes two safety fuses, which detect when a temperature limit has been reached and breaks the current connection to the heating element.

The present invention thus provides a cooking device 10 which can quickly and easily prepare baked potatoes in less time than conventional ovens, which potatoes have a texture and taste not found with potatoes prepared in a microwave oven. Along with the fast and efficient cooking features, device 10 also provides compact storage by using auxiliary legs 48, 104 which facilitates setting device 10 in a compact vertical direction. Thus, the present invention provides a cooking device with quick, easy, and convenient storage.

The foregoing description is a specific embodiment of the present invention. It should be appreciated that this embodiment is described for purposes of illustration only and that numerous alterations and modifications may be practiced by those skilled in the art without departing from the spirit and scope of the invention. For example, the present invention will operate sufficiently without mounting pads 88 to rest vanes 134. Alternatively, mounting pads could be added to the handle end of pan 60 to increase conduction through the skewer and further accelerate cooking time. In addition, a variety of blade designs could be used with skewers 130, including a flat edged blade. However, the greater the cross-sectional area of the blade, the greater the heat conduction capacity. In addition, it will be appreciated that the present invention is not limited to baking potatoes, and that vegetables, fruits, and meats may also be mounted onto the conductive skewers and cooked by both conduction and convection heating within the cooking chamber. For example, shish kabob and baked apples can be prepared utilizing the present invention. Moreover, because the skewers of the present invention are detachable, foodstuffs such as vegetables, fruits and meats can be cooked, poached, or steamed within the cooking chamber without utilizing the skewers. Accordingly, the present invention is adaptable for preparing numerous types of foodstuffs, in addition to baking potatoes. It is intended that all such modifications and alterations be included insofar as they come within the scope of the invention as claimed or the equivalents thereof.

We claim:

1. A potato baking device comprising:
   a self-supporting base,
   a lid mountable to said base,
   a cooking chamber defined by said base and said lid, said cooking chamber dimensioned to receive at least one average size potato therein,
   a heat conductive plate within said cooking chamber,
   a heat source connected to said heat conductive plate,
   removable, elongated skewer means for supporting a potato within said cooking chamber, said skewer means having opposite end portions and being formed of a heat conductive material and having a length sufficient to extend through an average potato lengthwise and to span a length of said conductive plate and rest said end portions thereon,
   sensing means mountable to said device for sensing the internal temperature of the potato inside said cooking chamber.

2. A potato baking device as defined in claim 1, wherein said sensing means is comprised of a tubular body formed of an insulating material having a temperature gauge at one end and a sensing tip at the other end.

3. A potato baking device as defined in claim 1, wherein said plate is generally concave and includes a surface extending about the periphery thereof for supporting opposite ends of said skewer means.

4. A potato baking device as defined in claim 1, wherein said heat conductive plate is comprised of an aluminum casting.

5. A potato baking device as defined in claim 1, wherein said skewer means is comprised of an elongated blade having an insulted handle means at one end.

6. A potato baking device as defined in claim 1, wherein said base and said plate include aligned notches for positioning said skewer means relative to said cooking chamber.

7. A potato baking device as defined in claim 1, wherein said heat source is an electrical heating element which is press fit into said plate.

8. A potato baking device as defined in claim 1, wherein said skewer means is comprised of an elongated metallic blade having an insulated handle means at one end thereof, said handle means including a flange to position said skewer means relative to said pan.

9. A potato baking device as defined in claim 8, wherein said handle means is molded of plastic and said blade is formed of aluminum.

10. A potato baking device comprising:
    a self-supporting base
    a lid mountable to said base
    a cooking chamber defined by said base and said lid, said cooking chamber dimensioned to receive at least one average size potato therein,
    a heat conductive plate within said cooking chamber,
    a heat source connected to said heat conductive plate, at least one elongated detachable skewer formed of a heat conductive material for supporting a potato within said cooking chamber, said skewer having sufficient length to extend through an average potato and to have portions of said skewer extending from both ends of said potato, means for positioning said skewer within said cooking chamber with said extending end portions of said skewer in contact with said heat conductive plate, wherein said skewer conducts heat from said plate into the interior of said potato.

11. A potato baking device as defined in claim 10 wherein said skewer includes insulated handle means for holding said skewer.

12. A potato baking device as defined in claim 10 wherein said skewer includes vanes having a generally decussate cross-section.

13. A potato baking device as defined in claim 10 wherein said skewer includes a longitudinal axis and is comprised of three or more equi-spaced vanes which are symmetrical about said axis.

14. A potato baking device as defined in claim 11 wherein said skewer is dimensioned such that said handle means is external to said chamber when said skewer is positioned within said cooking chamber.

15. A potato baking device as defined in claim 10 wherein said base includes locating means for positioning said skewer relative to said plate.

16. A potato baking device as defined in claim 10 wherein said base and said plate include aligned notches to position said skewer relative said base.

17. A potato baking device comprised of:
a self-supporting base,
a lid mountable to said base,
a cooking chamber defined by said base and said lid, said cooking chamber dimensioned to receive at least one average size potato therein,
a heat conductive plate within said cooking chamber,
a heat source connected to said heat conductive plate,
means for supporting a potato within said cooking chamber,
a temperature sensing unit for sensing the internal temperature of the potato inside said cooking chamber, said temperature sensing unit comprising a tubular body portion, having a temperature sensing tip at one end for penetrating a potato, and a temperature gauge at the other end for indicating the temperature detected by said sensor, wherein said tubular body portion insulates a bi-metallic element which is disposed between said sensing tip and said temperature gauge, and
means for positioning said temperature sensing tip within said cooking chamber.

18. A potato baking device as defined in claim 17 wherein said tubular body portion includes radially extending projections at the sensing tip end thereof for forming an incision in the potato which vents gas.

19. A potato baking device as defined in claim 17 wherein said sensing unit includes at least one projection near the sensing tip end of said sensing unit, said projection extending outward from the surface of said tubular body portion to penetrate said potato when said sensing unit is inserted therein.

20. A potato baking device comprised of:
a self-supporting base,
a lid mountable to said base
a cooking chamber defined by said base and said lid, said cooking chamber dimensioned to receive at least one average size potato therein,
a heat conductive plate within said cooking chamber,
a heat source connected to said heat conductive plate,
skewer means for supporting a potato within said cooking chamber wherein said skewer means includes opposite end portions adapted to rest upon a surface of said plate and to be detachable therefrom.

21. A device for cooking a foodstuff comprising:
a self-supporting base,
a lid mountable to said base,
a cooking chamber defined by said base and said lid,
a heat conductive plate within said cooking chamber,
heat source connected to said heat conductive plate,
removable, elongated skewer means for supporting said foodstuff within said cooking chamber, said skewer means having opposite end portions and being formed of a heat conductive material having a length sufficient to span a length of said heat conductive plate and rest said end portions thereon.

22. A device for cooking a foodstuff as defined in claim 21, wherein said skewer means is comprised of an elongated blade having an insulated handle means at one end.

* * * * *